United States Patent
Seong-jin et al.

(10) Patent No.: US 6,356,691 B2
(45) Date of Patent: *Mar. 12, 2002

(54) OPTICAL WAVEGUIDE DISPLAY HAVING EMBEDDED LIGHT SOURCE

(75) Inventors: Kim Seong-jin, Sungnam; Baek Sam-hak, Namyang ju; Song Si-yeon, Jeonju; Bae Byung-seong, Suwon; Yoo Jae-eun; Huh Chin-kyu, both of Seoul, all of (KR)

(73) Assignee: Iljin Corp., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,847

(22) Filed: Dec. 1, 1999

(30) Foreign Application Priority Data

Dec. 1, 1998 (KR) .............................. 98-52330

(51) Int. Cl.[7] ................................ G02B 6/04
(52) U.S. Cl. ................ 385/120; 385/116; 385/132; 385/901
(58) Field of Search ................ 385/115, 116, 385/120, 129, 130, 131, 132, 147, 901

(56) References Cited

U.S. PATENT DOCUMENTS

| | | | |
|---|---|---|---|
| 5,222,795 A | * 6/1993 | Hed | 362/32 |
| 5,377,027 A | * 12/1994 | Jelley et al. | 359/48 |
| 5,535,027 A | * 7/1996 | Kimura et al. | 359/58 |
| 5,910,706 A | * 6/1999 | Stevens et al. | 313/498 |
| 5,953,469 A | * 9/1999 | Zhou | 385/22 |
| 6,049,641 A | * 4/2000 | Deacon et al. | 385/15 |

* cited by examiner

Primary Examiner—Cassandra Spyrou
Assistant Examiner—Euncha Cherry
(74) Attorney, Agent, or Firm—Nixon & Vanderhye P.C.; Frank P. Presta

(57) ABSTRACT

An optical waveguide display having an embedded light source is provided. The optical waveguide display having an embedded light source includes a light source unit including a plurality of light sources for generating light according to an applied voltage and an optical waveguide display unit including a plurality of optical waveguides on which the light generated by the light source unit is incident. The light sources are aligned to be adjacent to the optical waveguides of the optical waveguide display unit in one panel so that the light generated by the light sources is directly incident on the optical waveguides. Accordingly, in the optical waveguide display having the embedded light source, optical loss is reduced. Also, the size of the outward shape of the display is reduced since a complicated optical structure can be simplified. The display is able to withstand a large amount of shock from the outside, and gray scale levels can be easily controlled.

2 Claims, 4 Drawing Sheets

OPTICAL WAVEGUIDE DISPLAY HAVING EMBEDDED LIGHT SOURCE

BACKGROUND OF THE INVENTION

1. Field of the Invention

The present invention relates to an optical waveguide display, and more particularly, to an optical waveguide display having an embedded light source, whereby, since the light source is embedded in a display panel, optical loss is reduced, the size of the outward shape of the display is reduced, the display is able to withstand a large amount of shock from the outside, and gray scale levels can be easily controlled.

2. Description of the Related Art

FIG. 1 shows a conventional optical waveguide display. In the structure of the conventional optical waveguide display, a light generated by a light source 10 is transmitted to an optical waveguide (not shown) of an optical waveguide display panel 14 by a light incidence device 12. The light incidence device 12, which is an optical device for directing the light generated by the light source 10 to the optical waveguide, includes various parts such as a lens, a prism, a spectroscope, and a filter.

In the conventional optical waveguide display, the light generated by the light source 10 is transmitted to the optical waveguide through the air since the light source 10 is located outside the optical waveguide display panel 14. Accordingly, light is lost due to a long light transmitting path. When physical shock is applied to such a complicated optical device, which includes the light source 10 and the light incidence device 12, the characteristic of the display may vary.

The light source 10 and the light incidence device 12 enlarge the outward shape of the display, cannot withstand a large amount of shock, and are difficult to manufacture. Furthermore, in order to obtain gray scale levels on the display, the amount of light which arrives at a pixel must be controlled by deviating some of the light inside the optical waveguide. In this case, the external surface of the optical waveguide must be coated with an electrooptics material, and an electrode for controlling the amount of the light deviation must be included. Therefore, manufacturing processes are complicated and selection of materials is restricted.

SUMMARY OF THE INVENTION

To solve the above problem, it is an object of the present invention to provide an optical waveguide display having an embedded light source, whereby, since the light source is embedded in a display panel, optical loss is reduced, the size of the outward shape of the display is reduced, the display is able to withstand a large amount of shock from the outside, and gray scale levels can be easily controlled.

Accordingly, to achieve the above object, there is provided an optical waveguide display having an embedded light source, comprising a light source unit comprising a plurality of light sources for generating light according to an applied voltage and an optical waveguide display unit comprising a plurality of optical waveguides on which the light generated by the light source unit is incident, wherein the light sources are aligned to be adjacent to the optical waveguides of the optical waveguide display unit in one panel so that the light generated by the light sources is directly incident on the optical waveguides.

The light source is preferably an electroluminescence light source comprising a phosphor layer for generating light in an electroluminescence, dielectric layers formed on and under the phosphor layer, and electroluminescence electrodes formed on and under the dielectric layers.

Also, the electroluminescence electrodes are preferably formed of a reflective material which reflects light.

Also, the light source is preferably a light emitting diode (LED) which generates light according to the applied voltage.

Also, the edge of the light source is preferably arranged to face the edge of the optical waveguide so that the light emitted from the edge of the light source is incident on the optical waveguide.

Also, the optical waveguide display unit preferably comprises a plurality of optical waveguides on which the light generated by the light sources is incident, a first substrate comprising a first electrode on which the plurality of optical waveguides are arranged and to which a predetermined control voltage is applied, and formed of a material having a refractive index lower than the refractive index of the optical waveguide, for totally internally reflecting the light transmitted to the plurality of optical waveguides, partitions located among the optical waveguides, the partitions having a refractive index lower than the refractive index of the optical waveguide, for totally reflecting the light transmitted to the optical waveguide, light output controllers located on the plurality of optical waveguides and formed of a material whose refractive index changes in response to the application of an electric field, light outputting units located on the light output controllers for refracting or scattering the light which passes through the light output controllers when the electric field is applied to the light output controllers and the refractive index of the light output controllers is increased, and a second substrate formed of a transparent material comprising a second electrode formed of a transparent conductive material which forms the electric field with the first electrode, the second substrate for outputting the light which passes through the light outputting units to the outside.

Also, the plurality of optical waveguides are preferably formed of optical fiber, which has a square edge and does not have any cladding.

Also, the light outputting controller is preferably formed of a liquid crystal layer.

To achieve the above object, there is provided an optical waveguide display having an embedded light source, comprising an optical waveguide display panel comprising a light source unit including a plurality of light sources for generating light according to an applied voltage and an optical waveguide display unit including a plurality of optical waveguides on which light generated by the light source unit is incident, a light source driver for driving the light source unit, a screen driver for driving the optical waveguide display unit, and a signal processing and controlling unit for processing an input video signal and controlling the light source driver and the screen driver, wherein the light sources are aligned to be adjacent to the optical waveguides of the optical waveguide display unit in one panel so that the light generated by the light sources is directly incident on the optical waveguide, the light source driver and the screen driver operate in synchronization with each other, the light source driver controls gray scales, and the screen driver controls selection of pixels.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Figure 1:
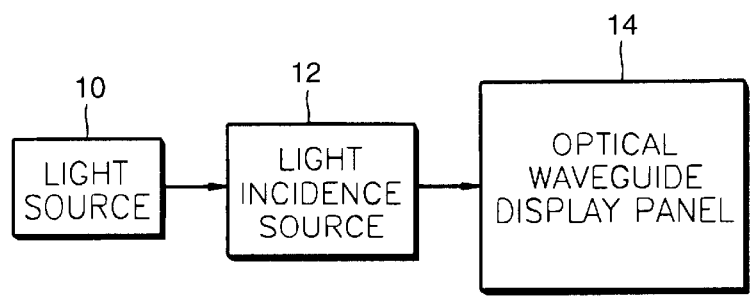
FIG. 1 shows a conventional optical waveguide display.
Figure 2:
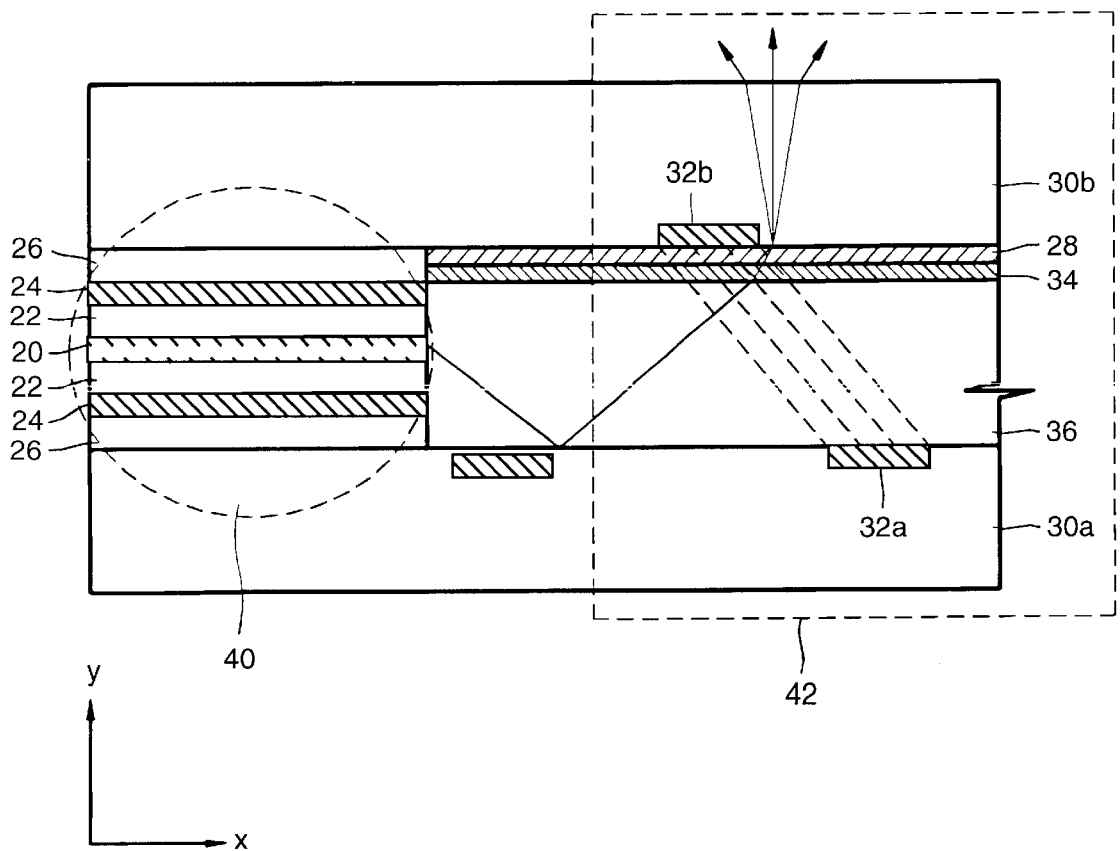
FIG. 2 is a sectional view of an optical waveguide display having an embedded lightsource according to a first embodiment of the present invention.
Figure 3:
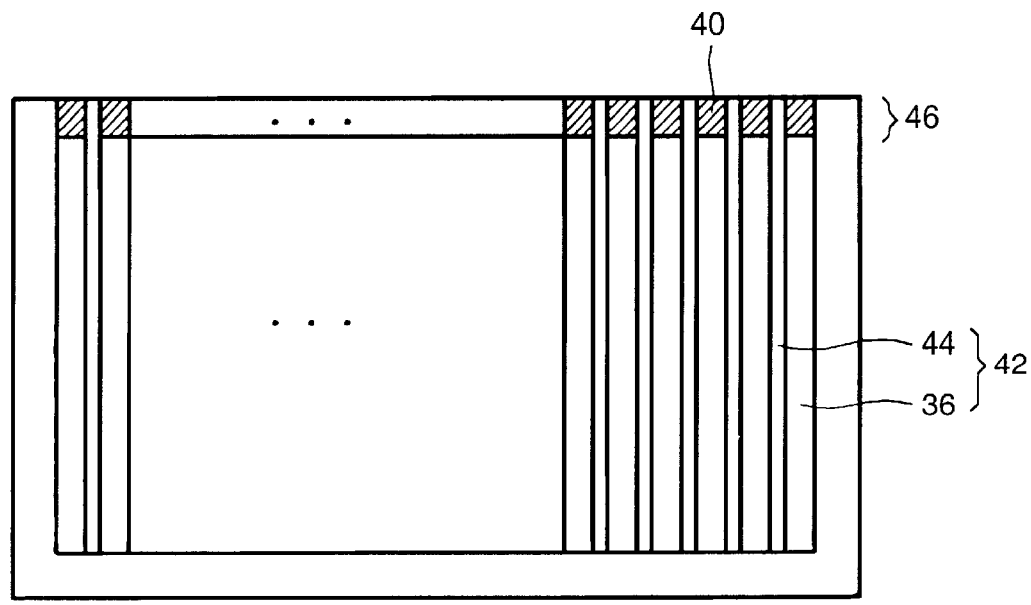
FIG. 3 is a front view of the optical waveguide display having the embedded light source according to the first embodiment of the present invention.

FIG. 2 is a sectional view of an optical waveguide display having an embedded light source according to a first embodiment of the present invention. FIG. 3 is a front view of the optical waveguide display having the embedded light source according to the first embodiment of the present invention.

In the first embodiment of the present invention, an electroluminescence light source is used as a light source. The optical waveguide display, shown in FIGS. 2 and 3, having the embedded light source according to the first embodiment of the present invention, includes an electroluminescence light source unit 46 and an optical waveguide display unit 42.

The electroluminescence light source unit 46 includes a plurality of electroluminescence light sources 40 for generating light in response to an electric field. The optical waveguide display unit 42 includes a plurality of optical waveguides 36 on which the light generated by the electroluminescence light sources 40 is incident.

As shown in FIG. 2, the electroluminescence light sources 40, which are thin film or thick film light sources for emitting electroluminescence, include phosphor layers 20 for generating light, dielectric layers 22 on and under the phosphor layers 20, and electroluminescence electrodes 24 on and under the dielectric layers 22. The electroluminescence electrodes 24 are formed of a reflective material which reflects light.

The edges of the phosphor layers 20 are arranged to face the edges of the optical waveguides 36 so that the light emitted from the edges of the phosphor layers 20 is incident on the optical waveguides 36.

The optical waveguide display unit 42 includes a plurality of optical waveguides 36 on which the light generated by the phosphor layers 20 of the electroluminescence light sources 40 is incident; a first substrate 30a on which the plurality of optical waveguides 36 are arranged and which is formed of a material having a refractive index lower than the refractive index of the optical waveguides 36, thus totally internally reflecting the light transmitted to the plurality of optical waveguides 36, wherein a first electrode 32a to which a predetermined control voltage is applied exists under the plurality of optical waveguides 36; barriers 44 located among the respective optical waveguides 36 and having a refractive index lower than the refractive index of the optical waveguides 36, for totally reflecting the light transmitted to the optical waveguides 36; light output controllers 34 located on the optical waveguides 36 and formed of a material whose refractive index varies according to the electric field; light outputting units 28 located on the light output controllers 34, for refracting or scattering the light that passes through the light output controllers 34 when the electric field is applied to the light output controllers 34 and the refractive index of the light output controllers 34 is increased; a second electrode 32b, which forms an electric field with the first electrode 32a, the second electrode 32b formed of a transparent conductive material on the light outputting unit 28, and a second substrate 30b formed of a transparent material, for outputting the light which passes through the light outputting units 28 to the outside.

In this embodiment, the optical waveguide 36 is formed of an optical fiber, which has a square edge and does not have any cladding. The light output controller 34 is formed of a liquid crystal layer. In the electroluminescence light sources 40, reference numeral 26 denotes an auxiliary substrate for making the thickness of the electroluminescence light sources 40 equal to the combined thicknesses of the optical waveguide 36, the light output controller 34, and the light outputting unit 28.

The operation of the optical waveguide display having the embedded light source according to the embodiment of the present invention, which has the above structure, will now be described.

Referring to FIG. 2, the color of luminescence produced by the electroluminescence light sources 40 depends on the kind of the phosphor layers 20. Various impurities are mixed with host materials such as ZnS in the phosphor layers 20. Since the phosphor layers 20 has a very high refractive index, when the electric field is generated by applying a voltage to the electroluminescence electrodes 24, most of the light generated by the phosphor layers 20 cannot pass through an interface between the phosphor layers 20 and the dielectric layers 22 and is trapped in the phosphor layers 20. Therefore, due to the total internal reflection of the light generated by the phosphor layers 20, it is transmitted in the direction of the x axis along the phosphor layers 20.

Figure 4:
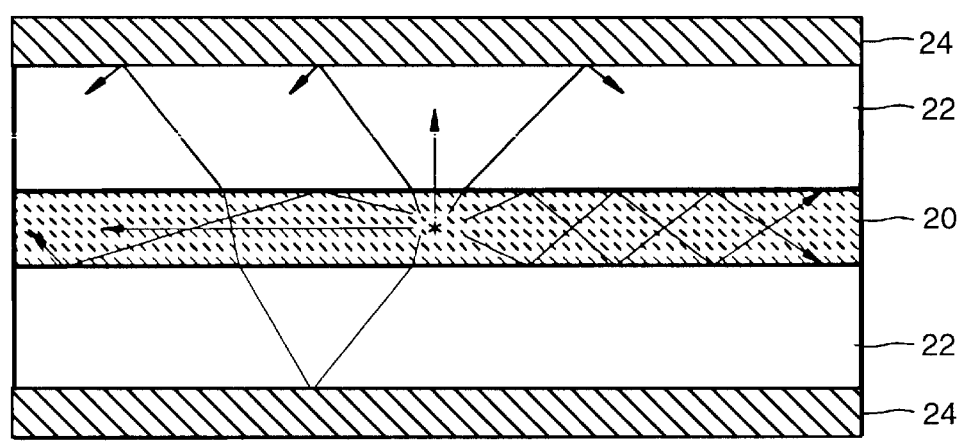
FIG. 4 shows the luminescence produced by the electroluminescence light source shown in FIG. 2.

The light generated by the phosphor layers 20 uniformly propagates in all directions. Light that is incident on the interface at an angle, between the phosphor layers 20 and the dielectric layers 22, smaller than a critical angle, passes through the interface and is reflected from the electroluminescence electrodes 24 formed of the reflective material. Light that is incident on the interface at an angle larger than the critical angle is totally internally reflected from the interface. FIG. 4 shows this phenomenon.

Since the light that is internally reflected in a phosphor layer cannot be used in usual electroluminescent displays, output light of usual electroluminescent displays is about 10% of the generated light. However, since the light emitted from the side surface of the phosphor layer is used in the present invention, it is possible to use the 90% of the generated light in the phosphor layer. Furthermore, when the electroluminescence electrodes 24 above and below the phosphor layers 20 are formed of the reflective material as shown in FIG. 4, it is possible to use all the light inside the phosphor layer by making the 10% of light which propagates to the direction of the y axis incident on the inside, thus letting the light propagate to the direction of the x axis.

The electroluminescence light sources 40 used as the light source are very thin and are located at the edge of the display panel as shown in FIG. 3. The light generated by the electroluminescence light sources 40 is emitted through the edges of the phosphor layers 20 which face the edges of the optical waveguides 36. Therefore, the light emitted from the edges of the phosphor layers 20 is incident on the inside of the optical waveguides 36 through the edges of the optical waveguides 36 which face the edges of the phosphor layers 20. The light which propagates along the optical waveguides 36 is output to the outside through the light outputting unit 28, which is a scattering layer which scatters light according to the change of the refractive index of the light outputting controller 34 when the electric field is generated between the first electrode 32a and the second electrode 32b, and the second substrate 30b.

Referring to FIGS. 2 and 3, since the phosphor layers 20 of the electroluminescence light sources 40 must be aligned with respect to the light incident edges of the plurality of optical waveguides 36, it is necessary to form a fine pattern. The electroluminescence light sources 40 can be formed by individually lining up the phosphor layers 20 and the dielectric layers 22 in a position where the light source is to be put or by forming the phosphor layers and the dielectric layers in a wide area, and then partially removing the phosphor layer and the dielectric layer. Also, it is possible to control the brightness of the emitted light by forming the electroluminescence electrodes 24 on the dielectric layers 22 on and under the phosphor layers 20 formed at the edge of the display panel and applying the voltage to the respective electrodes.

Figure 5:
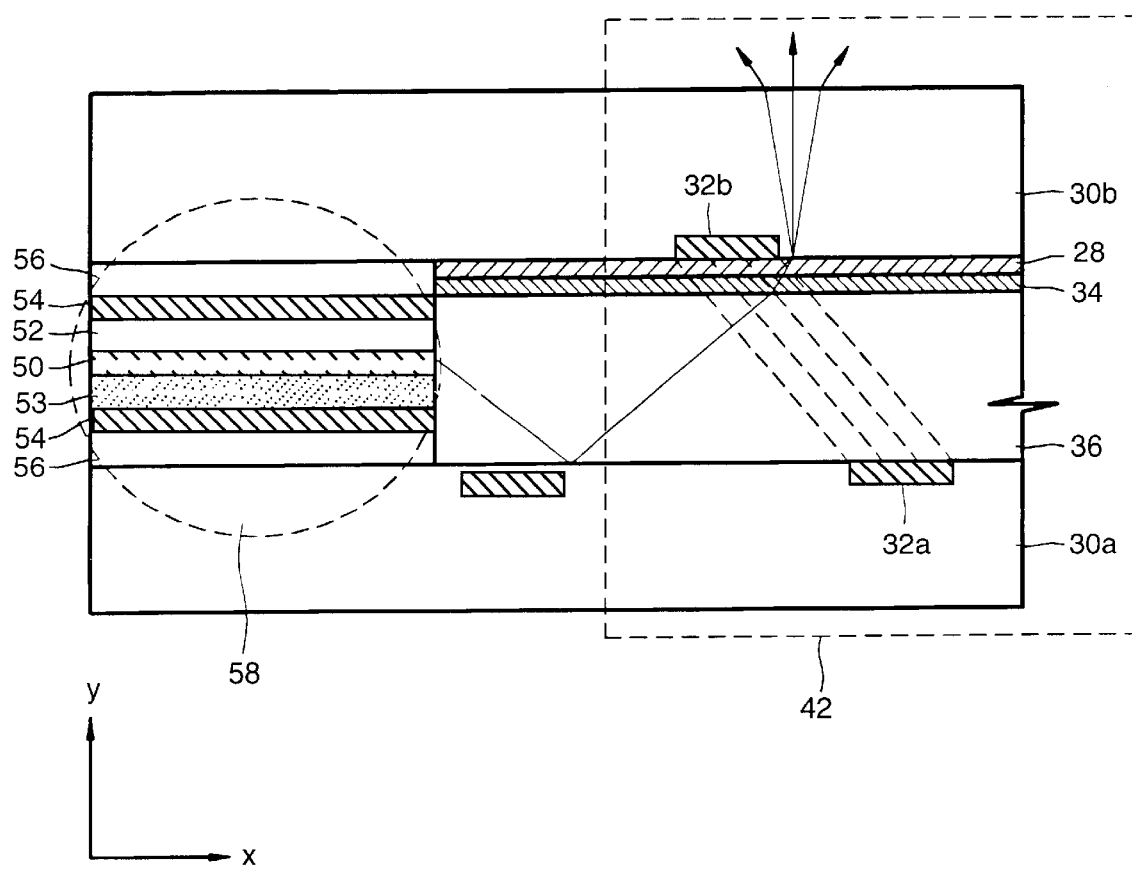
FIG. 5 is a sectional view of an optical waveguide display having an embedded light source according to a second embodiment of the present invention.

FIG. 5 is a sectional view of an optical waveguide display having an embedded light source according to a second embodiment of the present invention, where a light emission diode (LED) is used as the light source. Since the structure of the optical waveguide display unit 42 is identical to the structure of the optical waveguide display unit 42 according to the first embodiment shown in FIG. 2, description on the optical waveguide display unit 42 will be omitted.

The optical waveguide display having the embedded light source according to the second embodiment of the present invention, shown in FIG. 5, includes a light source unit including a plurality of LEDs 58 for generating light in response to an applied voltage. The optical waveguide display also includes the optical waveguide display unit 42 including the plurality of optical waveguides 36 on which the light generated by the plurality of LEDs 58 is incident. Active layers 50 of the LEDs 58 are aligned to be adjacent to the optical waveguides 36 of the optical waveguide display unit 42 in the display panel so that the light generated by the active layers 50 is directly incident on the optical waveguides 36.

The LED 58 which is a hetero junction LED includes the active layer 50, an N-type semiconductor 52 and a P-type semiconductor 53 on and under the active layer 50, and electrodes 54 formed on and under the N-type semiconductor 52 and the P-type semiconductor 53. The N-type semiconductor 52 and the P-type semiconductor 53 may be formed of GaAs or GaP. Reference numeral 56 which is an auxiliary substrate is for making the thickness of the LED 58 equal to the thickness obtained by adding the thickness of the optical waveguide 36, the thickness of the light output controller 34, and the thickness of the light outputting unit 28 to each other. The edges of the active layers 50 are arranged to face the edges of the optical waveguides 36 so that the light emitted from the edges of the active layers 50 is incident on the optical waveguides 36.

In the optical waveguide display having the embedded light source according to the second embodiment of the present invention, shown in FIG. 5, when a predetermined control voltage is applied to the electrodes 54, light is generated by the active layers 50. Therefore, the light emitted from the edges of the active layers 50 is incident on the optical waveguides 36 through the edges of the optical waveguides 36 which faces the edges of the active layers 50. The light which propagates along the optical waveguides 36 is output to the outside through the light outputting unit 28, which is a scattering layer which scatters light according to the change of the refractive index of the light outputting controller 34 when the electric field is generated between the first electrode 32a and the second electrode 32b, and the second substrate 30b.

Figure 6:
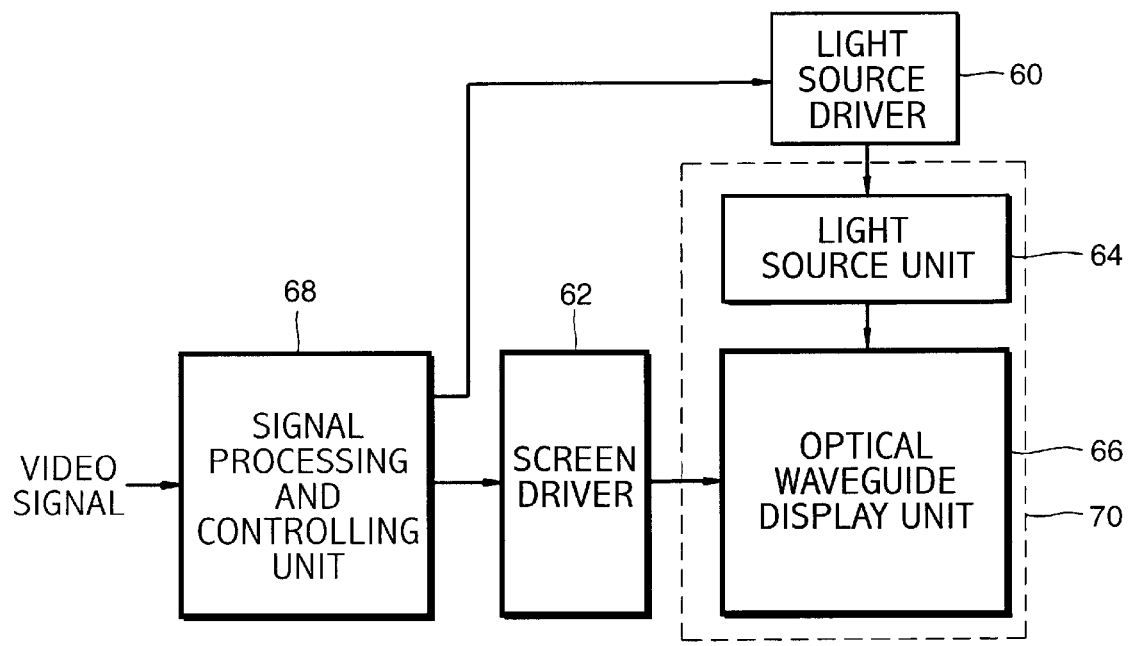
FIG. 6 is a block diagram of an optical waveguide display having an embedded light source according to the present invention.

FIG. 6 shows an optical waveguide display having an embedded light source according to the present invention, which includes a light source unit 64 including a plurality of light sources for generating light according to the applied voltage, an optical waveguide display panel 70 including an optical waveguide display unit 66. The optical waveguide display includes a plurality of waveguides on which the light generated by the light source unit 64 is incident, a light source driver 60 for applying a light source driving signal to the light source unit 64, a screen driver 62 for applying a pixel selection control signal to the optical waveguide display unit 66, and a signal processing and controlling unit 68 for processing an input video signal and controlling the light source driver 60 and the screen driver 62.

Referring to FIG. 6, when an electric signal is transmitted to the light source unit 64 by the signal processing and controlling unit 68 and the light source driver 60, light is generated by the respective light sources of the light source unit 64 and the generated light is incident on the respective optical waveguides of the optical waveguide display unit 66. The screen driver 62 applies a control signal to the optical waveguide display unit 66 and designates the position where the light is output to the outside. The screen driver 62 designates one line at a time and sequentially scans the entire screen. Although a line is simultaneously turned on, pixels of the line must be displayed to have different degrees of brightness. Therefore, the light source driver 60 controls the strength of the voltages applied to the respective light sources of the light source unit 64, generates light having different degrees of brightness, and transmits the light having the different degrees of brightness required for the respective pixels to the respective optical waveguides. The signal processing and controlling unit 68 controls the light source driver 60 and the screen driver 62 to operate in synchronization with each other.

According to the optical waveguide display having the embedded light source of the present invention, it is possible to reduce optical loss since the light source is embedded in the display panel, and to reduce the size of the outward shape of the display since it is possible to simplify a complicated optical structure. The optical waveguide display is very resistant to shock from the outside and easily controls gray scale levels.

What is claimed is:

1. An optical waveguide display having an embedded light source, comprising:

a light source unit comprising a plurality of electroluminescence light sources for generating guiding light;

a plurality of optical waveguides on which the light generated by the light source unit is incident;

a first substrate comprising a first electrode on which the plurality of optical waveguides are arranged and to which a predetermined control voltage is applied, and formed of a material having a refractive index lower than the refractive index of the optical waveguides, for totally internally reflecting the light transmitted through the plurality of the optical waveguides without cladding;

partitions located among the optical waveguides, the partitions having a refractive index lower than the refractive index of the optical waveguides, for totally reflecting the light transmitted to the optical waveguides;

liquid crystal layers located directly on the plurality of optical waveguides and formed of a material whose refractive index changes in response to the application of an electric field;

light outputting units located on the liquid crystal layers or refracting or scattering the light which passes through the liquid crystal layers when the electric field is applied to the liquid crystal layers and the refractive index of the liquid crystal is increased; and a second substrate comprising a second electrode formed of a transparent conductive material which forms the electric field with the first electrode, the second substrate for passing the light which passes through the light outputting units to the outside, wherein the edge of each light source is closely adhered to the edge of each optical waveguide of the optical waveguide display unit in a panel so that the light generated by the electroluminescence light sources is guided to the edge of each optical waveguide and directly incident in the optical waveguides, and light that is guided through each optical waveguide is emitted at the point to which a voltage is applied between the first substrate and the second substrate.

2. The optical waveguide display of claim 1, wherein the electroluminescence light source comprises a phosphor layer which has a high refractive index, dielectric layers which have lower refractive indices on and under the phosphor layer, and electrodes which have a high reflectance on and under the dielectric layers.

* * * * *